122,439

UNITED STATES PATENT OFFICE.

RICHARD T. CLARKE, OF COVINGTON, KENTUCKY.

IMPROVEMENT IN TREATING VEGETABLE OILS.

Specification forming part of Letters Patent No. 122,439, dated January 2, 1872.

Be it known that I, RICHARD T. CLARKE, of Covington, in the county of Kenton and State of Kentucky, have invented certain new and useful Improvements in the Processes of Treating Linseed, Cotton-Seed, Castor-Bean, and other Vegetable Oils, of which the following is a specification:

The first part of my invention relates to the purification of vegetable oils by a new process, whereby the pure oil is separated from those fatty, feculent, and other impurities which all vegetable oils contain immediately after being expressed from the seed or fruit, flower, or the like. This purification is so thorough that oils purified by my process will always remain fluid and transparent, are never fatty or greasy, and therefore can always be used with the most delicate pigment—as, for instance, zinc-white—without discoloring the same; and at the same time oil thus purified gives a fine body to a pigment, for example, giving zinc-white a body almost equal to white lead, and also so that these oils, excepting when treated for the manufacture of varnish, are useful in food or for medicinal purposes. This process depends in part upon mechanical means, and in part upon chemical action. Vegetable oils contain, among other ingredients, albumen, carbonic acid, tannic acid in hardly appreciable quantity, fat, fatty substances, and feculent matter. Of these ingredients, the pure albumen and carbonic acid are the desirable elements of the oil to be retained; while to render the oil pure, fluid, and transparent, the fat, fatty, and feculent matters must be first separated from the albumen and carbonic acid, and then removed altogether. This separation of the impurities from the albumen and carbonic acid I effect by the first part of my process, which is as follows: I agitate the crude oil by any mechanical device or apparatus deemed advisable, in order to break up the body of the oil and to bring atmospheric air in contact with the particles of the crude oil. This device may be an ordinary atmospheric churn, or a solid shaft provided with arms, at whose ends are wires or rods caused to rapidly revolve in the crude oil, or the crude oil may be placed in coils of pipes of octagon or other shape, having corners, and the pipes then made to revolve. In short I do not limit myself to any device or apparatus, but claim the agitation of the oil as a part of and in connection with my process. This is the mechanical means employed in my process. This oil thus agitated must be brought into contact with lead. This lead may be presented to the oil during the time of agitation or subsequently to agitation. The lead may, therefore, be presented to the oil in the vessel in which the agitation takes place during the time of agitation or afterwards, or in another vessel after agitation, and this contact may be effected by lining the vessel with lead, or by making a part or the whole of the agitator of lead, or by placing shot or lead scraps, &c., in the vessel, or by another apparatus or device. I do not limit myself to any particular device or apparatus for presenting the lead to the oil. The following chemical changes now take place: The carbonic acid in the oil attacks the lead brought into contact with it, and forms carbonate of lead. This carbonate of lead is rejected by the pure albumen, and absorbed by the fatty and feculent matters of the oil, forming an oleate of lead. The atmospheric air already brought into the mass by agitation now attacks the mass, and at the same time releases the carbonic acid and forms an oxide of lead. This oxide of lead is kept in union with the fats of the oil, and the fat permeated with the lead is of a dirty, greenish yellow color, and, being heavy with lead, its specific gravity is greater than that of the pure oil from which it has been separated, and it immediately settles to the bottom of the tank, and collects there in large masses plainly visible to the eye. The time required for the mass to settle is usually about twelve hours, though less or more time is often occupied in settling. The agitation of the oil by some mechanical device, in connection with presenting the oil to the lead, aids the process by presenting the oil more universally to the lead, so that if the oil is treated with lead subsequent to its agitation and in a different vessel, it is well to place an agitating device therein, but it is not absolutely necessary. The process of oxidizing the lead is hastened and facilitated by introducing air into the mass of the oil by forcing it in by pressure. This air acts in the same manner as the air introduced by the agitation of the mass of oil. It is supplementary to the previous parts of this process, but is not absolutely necessary. The particular method I usually employ in treating the oil so as to purify it by the aforementioned agitation and chemical changes is as follows, viz: I take a tank lined with metallic lead. In this tank is placed an upright solid shaft, with two arms on opposite sides of the shaft. These arms are provided with transverse and cross-prongs or wires, which machine as a whole I name an agitator. The shaft is made to revolve by suitable machinery. This tank is also provided with a supplementary apparatus for forcing the air into the oil near the bottom of the tank during the process of agitation. I then place in the tank the vegetable oil which I desire to purify. The agitator is then caused to revolve from two to four hours, and the whole mass of oil is thus thoroughly stirred and agitated. At the same time this agitation is going on a constant current of atmospheric air is forced into the liquid near the bottom of the tank. The effect of these mechanical motions and their chemical effect is as above stated. Passing from this particular mode of applying the process, we return to the general and supplementary processes. After the fatty and feculent matters, which have absorbed the lead and been made heavy by it, have settled to the bottom of the tank, I draw off this heavy feculent mass from the bottom of the tank, leaving only the purified oil in the tank; or, if preferable, I decant the purified oil from the tank into a second vessel. If a second vessel is used, it is better that it should have lead in it, and this lead be in contact with the oil. To further purify this oil, I add to it distilled or pure water in the proportion of an ounce of water to every gallon of oil. This water acts upon the liquid as follows: The water attacks the sulphur, and also dissolves the organic matters, such as gelatine, gluten, &c., in the oil, which are soluble in water, and precipitates them to the bottom of the tank in broken up yellowish masses. The oil, after being thus treated, is allowed to remain in tank for forty-eight hours, or more or less, as may be necessary for a final settling. As soon as the organic and feculent matters have fully settled, the oil is drawn off from the sediment, or the sediment drawn out of the bottom of the tank, leaving the pure oil within. This oil, so purified, is free from fat-oil, sulphur, gelatine, water, and other impurities. There now remain in this purified oil albumen and carbonic acid, which are its most desirable properties. A few elementary substances also remain in the oil, but of a kind and in such small quantities as not to injure the oil.

Linseed-oil after having passed through these two stages of the process is good for general uses. Cotton-seed or castor-bean oils treated with this and the first process become medium drying oils. Linseed is a better drying oil after this process than cotton-seed or castor-bean oil. This process is supplementary to the first, and is not to be used without the first, and only after the first.

The second part of my invention relates to a new and useful process for rendering those oils which are naturally drying oils, very drying oils, and rendering those which are naturally non-drying good drying oils. Drying oils prepared by this process are peculiarly applicable to the use of artists in painting and oiling of pictures, and may be employed with advantage to give an enameled surface to metallic roofing that will not crack or blister in the sun, and that will preserve the surface of the metal from oxidation. The oil, previously treated by the first part of my invention, is again agitated or stirred, and at the same time is brought into very thorough contact with lead. And here again it is not absolutely essential that the lead should be present in any particular form. But the more fully the lead is brought into universal contact with the oil, the more perfect and rapid will said lead be taken up in the the form of a carbonate by the oil, and the more steady and complete the agitation of the oil, the more perfect and rapid will be the oxidation of the carbonate of lead, and also the oxidation of the oil itself. The oxidation of these oils is what renders them good drying oils. The best drying oils are obtained by a slow, steady, and thorough agitation of the oil, and at the same time presenting the lead most thoroughly and completely to the oil. This process is facilitated by the light of day, and the brighter the light the more rapidly the oil is made a drying oil, as the light facilitates the oxidation of the oil.

The particular mechanical arrangements for the agitation of the oil and the presentment of lead to it, which I at present employ, are as follows: The oil previously treated by the first part of my invention is decanted into a lead-lined tank, in which is also lead, shot, or small scraps of metallic lead to the depth of from four to six inches. Within this tank a revolving rake is placed sufficiently near the bottom of the tank to constantly agitate the loose lead, and also the oil decanted into this tank. This agitation operates most successfully when it is gentle—that is, when the rake revolves very slowly, with a speed of about two revolutions to the minute. During this process the brighter the light to which the oil in the tank is exposed the more rapid is the oxidation of the carbonate of lead. This carbonate of lead shows itself in the form of a white substance, and immediately upon being oxidized becomes black and falls to the bottom of the tank. The length of this process will vary from ten to forty-eight hours, according to the style and quality of oil desired. Cotton-seed and castor-bean oil, and other oils naturally non-drying, having passed under and through the first, second, and this latter process, become good drying oils in spite of their naturally non-drying quality, while linseed-oil, naturally a drying oil, under these three processes becomes a very drying oil, and is equal in this and in other qualities to the best boiled oils. Linseed-oil treated by this third process is a very rapid drying oil. For the use of varnish makers it will require to be treated with this last process for thirty-six hours. For printers' varnish—a heavy varnish—the linseed-oil must be so treated for about six days. Non-drying oils treated by this third process become good drying oils.

Claims.

What I claim as my invention is—

1. The process of purifying vegetable oils, substantially as and for the purposes set forth.

2. The agitation of vegetable oils by mechanical means before or during the presentation of lead to said oils, as a distinct part of the process for their purification.

3. The presentation of metallic lead to vegetable oils during or after their agitation, as a distinct part of the process for their purification, when said presentation is made without the addition of heat in any form.

4. The introduction by pressure of air, when pure and cold, into vegetable oils as a supplement to their agitation, and as an optional part of the process for their purification.

5. As a distinct part of the process of the purification of vegetable oils, the introduction of water alone, and when separated from any other element into said oils after their agitation and treatment with lead, for the purpose of precipitating the parenchymous and extraneous matters in said oils, and not for the washing simply of said oils.

6. The process of making drying oils from vegetable-oil, substantially as and for the purposes set forth.

7. The agitation of pure vegetable oils, by mechanical means, before or during the presentation of lead to said oils, as a distinct part of the process for rendering them drying oils.

8. The presentation of metallic lead to pure vegetable oils before, during, or after their agitation, as a distinct part of the process for rendering them drying oils, when said presentation is made without the addition of heat in any form.

R. T. CLARKE.

Witnesses:
  E. P. DUSTIN,
  WM. H. FISHER. (47)